United States Patent [19]
Mule

[11] 3,797,178
[45] Mar. 19, 1974

[54] VEHICLE SHELTER EMPLOYING A DUAL OPERATING SELECTIVE HINGE APPARATUS

[76] Inventor: James Mule, 35 Lopatcong Dr., Trenton, N.J. 08638

[22] Filed: Feb. 12, 1973

[21] Appl. No.: 331,650

[52] U.S. Cl............ 52/66, 16/147, 49/193, 292/161
[51] Int. Cl............................................. E04b 7/16
[58] Field of Search............ 52/66, 64, 72, 43, 19, 52/1, 200, 20; 16/147; 292/161; 49/192, 193

[56] References Cited
UNITED STATES PATENTS

| | | | |
|---|---|---|---|
| 2,195,991 | 4/1940 | Lovett | 16/147 |
| 2,740,997 | 4/1956 | Gipslis | 52/66 |
| 3,258,886 | 7/1966 | Batton | 52/66 |
| 3,261,134 | 7/1966 | Crist | 52/66 |
| 3,608,252 | 9/1971 | Bisson | 52/66 |
| 3,685,093 | 8/1972 | Sanders | 49/193 |

FOREIGN PATENTS OR APPLICATIONS

| | | | |
|---|---|---|---|
| 866,229 | 4/1961 | Great Britain | 52/66 |
| 1,244,377 | 7/1967 | Germany | 52/66 |

Primary Examiner—Henry C. Sutherland
Assistant Examiner—Henry E. Raduazo

[57] ABSTRACT

There is disclosed a portable vehicle shelter for snowmobiles and similar vehicles which comprises a cover member pivotally mounted on a frame assembly operated by means of a lever controlled assembly which can selectively form a hinge with first and second pin assemblies mounted on the frame to enable opening of said cover member from either a first or second side of said shelter.

10 Claims, 5 Drawing Figures

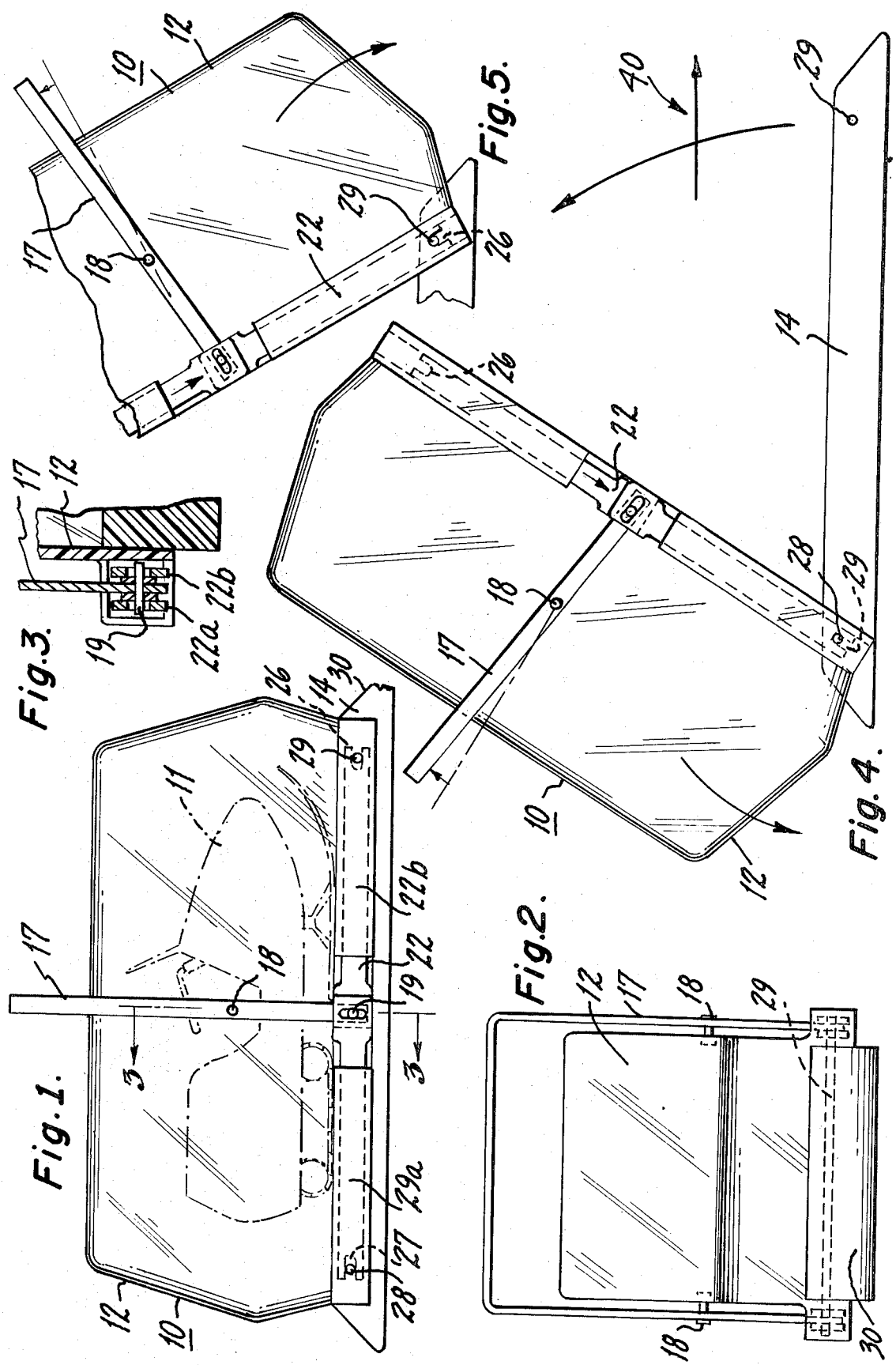

VEHICLE SHELTER EMPLOYING A DUAL OPERATING SELECTIVE HINGE APPARATUS

BACKGROUND OF INVENTION

This invention relates to a shelter or garage for a vehicle, and more particularly to such a shelter which can be operated to gain access from a first or second side of the shelter.

As is known besides the conventional automobile, many other types of vehicles have found widespread use in regard to leisure time activities and so on. Thus, the number of motorcycles, snowmobiles, golf carts and various other vehicles have greatly increased.

In regard to such vehicles, it is also known that often times they are not garaged or otherwise protected from the elements and are therefore exposed to corrosion and rusting.

It would be desireable to provide a portable enclosure for such vehicles, which enclosure or shelter is inexpensive to fabricate, easy to operate and simple to transport.

While portable enclosures for automobiles and other vehicles are known as evidenced by a number of patents as U.S. Pat. No. 2,853,745 entitled "Garage" by Peter Gipslis, issued on Sept. 30, 1958 and U.S. Pat. No. 3,258,886 entitled "Tiltable Vehicle Shelter" by A.R. Burton, issued on July 5, 1966, it is noted that such enclosures of the prior art are relatively complicated in structure and expensive to manufacture. The disadvantages of such enclosures are inherent in the relatively complicated operating mechanism to enable opening and closing of the shelter to permit vehicle access.

It is therefore an object of the present invention to provide a new and improved vehicle shelter, which is simpler to operate and capable of being opened in either a first or second direction to permit easy access to a vehicle.

DESCRIPTION OF PREFERRED EMBODIMENT

A vehicle shelter comprises a bottom frame member including side walls and front and back walls forming a relatively rectangular configuration for receiving a vehicle, a cover member defining a housing with an opened bottom end mounted on said frame and pivotable with respect to the frame in a first or second position about a first or second end of said frame, a lever means is slideably positioned on said cover member and is adapted to coact with projections mounted on said frame to form a first pivotable hinge assembly with said projection at one end of the frame for a first opening mode and to from a second pivotable hinge assembly with another projection at said other end for a second opening mode.

BRIEF DESCRIPTION OF FIGURES

FIG. 1 is a side elevational view of a shelter or garage according to this invention.

FIG. 2 is a front elevational view of the shelter according to FIG. 1.

FIG. 3 is a partial cross-sectional view taken through line 3—3 of FIG. 1.

FIG. 4 is a side elevational view showing a first opening position of the shelter according to FIG. 1.

FIG. 5 is a partial side elevational view showing a second opening position of the shelter according to FIG. 1.

DETAILED DESCRIPTION

Referring to FIG. 1 there is shown a shelter 10 for a vehicle such as a snowmobile 11. In any event, it is understood that the shelter or garage 10 can be used to house motorcycles, automobiles, golf carts, bicycles or any other apparatus to be so protected from the elements.

The shelter 10 includes a cover member 12 which, as will be explained, can be pivoted about the left or right sides to provide a dual opening characteristic enabling a vehicle operator to drive the vehicle in from the left side, for example, and out from the right side. The cover member 12 may be fabricated from a metal or a suitable plastic and is dimensioned to enclose a suitable vehicle as 11. Cover member 12 is a housing with an opened bottom end, a closed top contiguous with sidewalls and end walls. The plastic may be a clear vinyl so the user can view the vehicle when enclosed within the shelter 10.

The cover member 12 rests upon a bottom frame assembly 14. The frame assembly is essentially rectangular in configuration although other geometrical shapes would suffice. There may be a floor 15 supported by the frame assembly, or alternatively, the frame assembly may be graduated down in size and the ground or other structure as a driveway and so on may be used in lieu of a floor.

In any event, the cover member 12 has pivotally secured thereto a handle assembly 17 for opening and closing the cover member 12 for access from either the right or left directions. The handle assembly 17 is secured to the cover member by a pin 18 or some other suitable fastening device. The handle assembly 17 has an extending projection 19 near the frame end which projection is inserted in a slot 20 associated with a reciprocating or sliding lever member 22. As shown in FIG. 3, the handle assembly is a U shaped member and encircles the top and two sidewalls. The lever member 22 is capable as seen of moving towards the right or left. As shown in FIG. 1 the lever member 22 has a channel or notch portion 26 on the right side and a corresponding channel or notch 27 on the left side.

The channels 26 and 27 are respectively coacting with or surrounding two rod members 28 and 29 secured to the frame assembly 14. In practice the sliding lever member 22 is fabricated from two pieces 22A and 22B (FIG. 3). While the members 28 and 29 are shown as rods (FIG. 2), they, of course, can be pins or pivot type members for coacting with the channels formed in the lever 22.

As can be seen from FIG. 1, the shelter 10 is in the closed position whereby each rod 28 and 29 is being accommodated within the associated channel as 26 and 27. The handle 17 can be locked in this position by a suitable lock arrangement so that it cannot be moved, thus securing the vehicle 11 against theft while protecting the same from the elements due to the cover member 12.

Also shown in FIG. 2 is a ramp structure 30 which enables a vehicle as 11 to gain easy access to the shelter 10.

RIGHT SIDE OPENING OPERATION

Referring to FIG. 4, the shelter 10 is shown opened in a right side position. The operator or user of the shelter after unlocking the handle assembly 17, now proceeds to move the handle to the right, thus causes lever 22 to slide towards rod 28 so that the extreme end wall of channel 29 is touching rod 28. This action causes channel 26 to clear the rod 29. The handle is lifted towards the left thus lifting cover member to cause the same to pivot about the hinge formed by 28 and 29 and a similar set-up on the opposite end. Due to the weight distribution, the cover member as thusly tilted away from the frame 14 will maintain the position shown in FIG. 4. The operator can then remove the vehicle 11 from shelter 10 in the direction shown by arrow 40. In any event, he can also drive the vehicle into the shelter in the direction opposite to arrow 40.

LEFT SIDE OPENING OPERATION

FIG. 5 is a partial section view to show left side opening.

Similarly, if handle 17 were moved towards the left, the channel 26 abuts against rod 29, while channel 29 clears rod 28. The handle 17 pivots about pin 18 as the projection 19 forces the lever 22 to slide in the direction indicated. The cover is lifted as shown by means of the handle and the hinge now formed between rod 29 and channel 26 causing left side opening.

In summation, the shelter 10 thus described provides the following advantages:

1. A vehicle can be driven into the shelter from either side and driven out from the other side.
2. The lever and handle assembly provide an inexpensive, economical hinge action and lifting action.
3. The shelter can be fabricated from plastic and can be light, easy to transport and inexpensive to fabricate.

I claim:

1. A vehicle shelter comprising:
   a. a bottom frame assembly including side walls and front and back walls forming a relatively rectangular configuration for receiving a vehicle therein,
   b. a cover member defining a housing with an opened bottom end mounted on said frame and pivotable with respect to said frame in a first or second position about a first or second end of said frame,
   c. lever means slideably mounted to said cover member near said bottom opened end and extending towards said first and second end, said lever means including a first channel at one end closest to said first end and a second channel at said other end closet to said second end,
   d. a first and a second projection secured to said frame and respectively located near said first and second ends, and
   e. handle means coupled to said lever means for sliding said first channel about said first projection to pivot said cover member about said first end for said first position and to slide said second channel about said second projection in a second direction to pivot said cover member about said second end in said second position, to enable a user to guide a vehicle in said shelter in a first direction and out of said shelter in the same direction corresponding to said first and second positions.

2. The vehicle shelter according to claim 1 wherein said cover member is fabricated from a hard plastic.

3. The vehicle shelter according to claim 1 wherein said handle means comprises a U shaped handle pivotably mounted to said cover member and having means at the outermost portion of the arms of said U for coupling to said lever means.

4. The vehicle shelter according to claim 1 further comprising:
   a. first and second ramps each contiguous with said sides of said frame corresponding to said first and second positions to enable said vehicle to gain easy access to the area bounded by said frame.

5. The vehicle shelter according to claim 2 wherein said plastic is a clear, transparent plastic.

6. A shelter or garage apparatus comprising:
   a. a cover member having sidewalls, end walls and a top wall with an opened bottom end,
   b. a frame member, relatively congruent with said bottom opened end of said cover member, said frame member having a first projection at one side and a second projection at said other side,
   c. a lever member slideably mounted on said cover member, said lever having a first channel at a first extreme end and a second channel at a second extreme end for respectively coacting with and surrounding said first and second projections when said cover member is placed in conguency with said frame, and
   d. handle means coupled to said lever to slide the same in a first position to cause one of said channels to clear said associated projection and said other channel to form a hinge with said associated projection to allow said cover member to pivot at one of said sidewalls, and in a second position to allow said cover member to pivot at the opposite sidewall from said one to thereby provide a dual opening operation.

7. The apparatus according to claim 6 wherein said handle means comprises a U shaped handle pivotably mounted to said cover member and having means at the outermost position of the arms of said U for coupling to said lever means.

8. The apparatus according to claim 6 wherein said cover member is fabricated from a transparent plastic.

9. The vehicle shelter according to claim 6 further comprising:
   a. first and second ramps each contiguous with said sides of said frame corresponding to said first and second positions to enable said vehicle to gain easy access to the shelter when said cover member is pivoted to one of said opened positions.

10. The vehicle shelter according to claim 6 wherein said frame member is of a relatively rectangular configuration having parallel side walls and parallel end wals and a surface within the area bounded by said walls for accommodating a vehicle.

* * * * *